G. H. COFFEE.
COTTON AND CORN-PLANTER.

No. 183,136. Patented Oct. 10, 1876.

WITNESSES
Robert Everitt
B. H. Morse

INVENTOR
George H. Coffee
Chipman Hosmer & Co
ATTORNEYS

JAMES R. OSGOOD & CO BOSTON

UNITED STATES PATENT OFFICE.

GEORGE H. COFFEE, OF GAINESVILLE, MISSOURI.

IMPROVEMENT IN COTTON AND CORN PLANTERS.

Specification forming part of Letters Patent No. 183,136, dated October 10, 1876; application filed September 11, 1875.

*To all whom it may concern:*

Be it known that I, GEORGE HOLLAND COFFEE, of Gainesville, in the county of Ozark and State of Missouri, have invented a new and valuable Improvement in Cotton and Corn Planters; and I do hereby declare that the following is a full, clear, and exact description of the construction and operation of the same, reference being had to the annexed drawings, making a part of this specification, and to the letters and figures of reference marked thereon.

Figure 1:
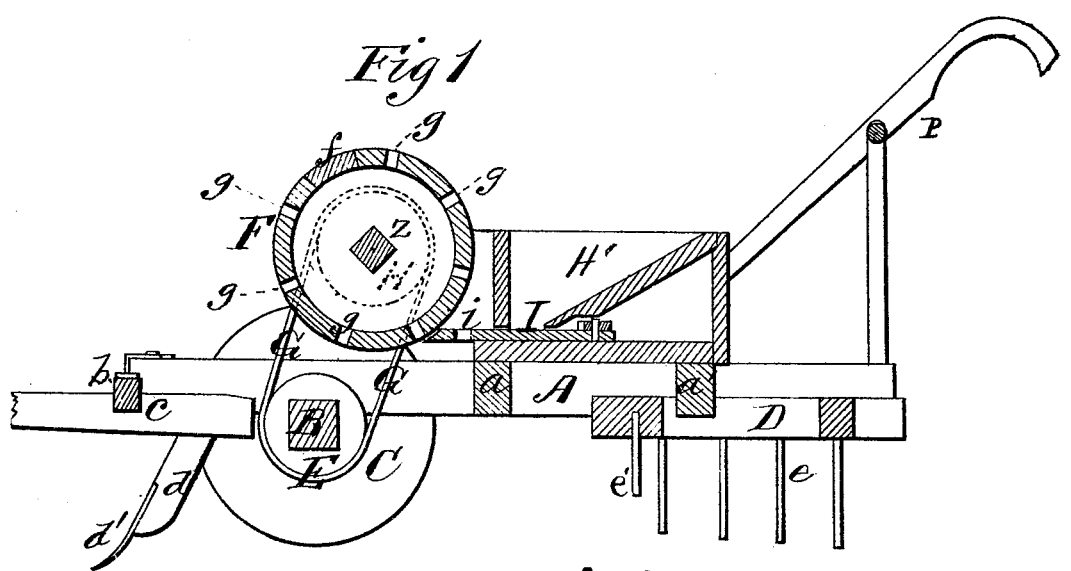
Figure 2:
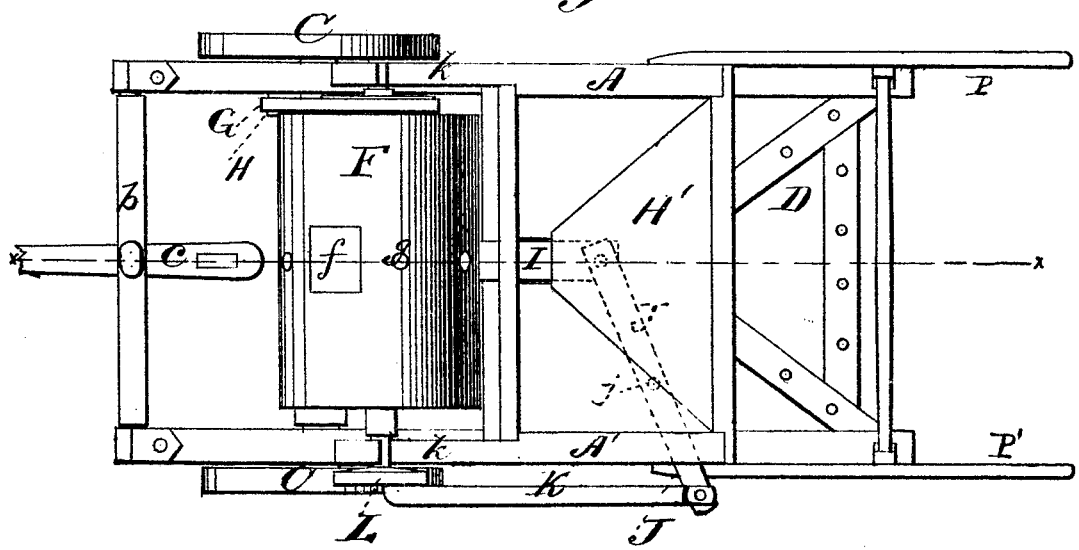

Figure 1 of the drawings is a representation of a longitudinal vertical section of my planter, and Fig. 2 is a plan view of the same.

This invention has relation to improvements in combined corn and cotton planters; and it consists in the arrangement and novel construction of the various devices used, whereby very useful and desirable results are obtained, as will be hereinafter more fully explained and claimed.

In the annexed drawings, A A' designate the two parallel bars of my improved planter, which are connected and braced by transverse beams $a\ a'$, and in front by a rock-shaft, $b$, to which is rigidly bolted the beam $c$ of a standard, $d$, with shovel $d'$. The frame thus formed is of rectangular form, and is supported upon the axle B of two transporting-wheels, C, and in rear by a triangular harrow-frame, D, carrying teeth $e$. E represents a pulley-wheel, which is keyed or otherwise rigidly secured upon axle B, and which rotates therewith. This wheel communicates a rotary motion to a hollow drum, F, through the medium of an endless belt, G, passing over the said pulley, and around a second pulley-wheel, H, keyed upon the shaft Z of the said drum, as shown in Fig. 1. Drum F is provided with openings, closed by doors $f$, through which cotton-seed is introduced into its interior, and with perforations $g$, through which the seed is allowed to drop intermittently into the furrow made by the shovel on the end of standard $d$. Drum F has its bearings in the front extensions $k$ of the sides of a tapering hopper, H', secured upon the frame between the transporting-wheel and the harrow. This hopper is provided with a longitudinally-arranged slide, I, having endwise movement in relation to the said hopper, and provided in its outer end with a perforation, $i$. Slide I is caused to reciprocate horizontally during the progress of the machine through the medium of a horizontally-vibrating lever, J, pivoted to the rear end of the slide, and fulcrumed at $j$ to the body of the hopper. This lever is operated by means of a pitman, K, pivoted to the outer end of lever J, and connected by means of a wrist-pin, $l$, to a crank-wheel, L, keyed upon the opposite end of the shaft of drum F to that carrying the pulley-wheel H.

When the planter is in motion the rotation of axle B caused thereby will communicate motion to drum F through the medium of endless belt G and pulley-wheels H E. The rotation of the drum will communicate a rectilinear reciprocating motion to slide I through the medium of crank-wheel L, pitman K, and the horizontally-vibrating lever J, causing seed-corn to be dropped by the slide at each reciprocation thereof.

In this construction of a dropper the lower edge of the front of hopper H' is made to serve as a "striker" for scraping any excess of seed out of perforation $i$ in the slide.

The machine will be guided by the plowman through the medium of handles P P', bolted to the side rails A A' of the planter-frame. During the planting of corn or cotton the front tooth $e'$ will be raised up, as shown in Fig. 1, and the teeth in line therewith will be so separated as to avoid taking the corn out of the furrow. By this means grass and weeds may be torn up and destroyed; but when the device is used as a wheel-drag or harrow the tooth $e'$ will be on the same level with the rest.

What I claim as new, and desire to secure by Letters Patent, is—

1. In a machine for planting corn or cotton, the raised independent hollow seed-dropper drum F, having pulley H, the axle B of transporting-wheels C, having pulley E, the endless belt G, communicating motion from the wheels to the drum, the crank-wheel L on the drum-shaft Z, pitman K operating horizontally-vibrating lever J, and the slide I, having dropper $i$, and reciprocating in the hopper H', combined and arranged substantially as specified.

2. The combination, with the axle Z, carrying the raised independent seed-dropper drum F, and pulley-wheels H, and crank-wheel L, of the axle B, supporting-wheels C, and pulley E, the endless belt G, pitman K, lever J, hopper H, and seed-slide I, substantially as set forth.

In testimony that I claim the above I have hereunto subscribed my name in the presence of two witnesses.

GEORGE HOLLAND COFFEE.

Witnesses:
A. E. SCOTT,
W. A. ROBERTS.